US012307463B2

(12) United States Patent
Alampady et al.

(10) Patent No.: US 12,307,463 B2
(45) Date of Patent: May 20, 2025

(54) MANAGING DATA TRANSACTIONS

(71) Applicant: Motorola Mobility LLC, Chicago, IL (US)

(72) Inventors: Hariprasad Shanbhogue Alampady, Bangalore (IN); Amit Kumar Agrawal, Bangalore (IN); Bhavana Bhat, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 76 days.

(21) Appl. No.: 18/140,869

(22) Filed: Apr. 28, 2023

(65) Prior Publication Data

US 2024/0362637 A1     Oct. 31, 2024

(51) Int. Cl.
*G06Q 20/40* (2012.01)
(52) U.S. Cl.
CPC ..... *G06Q 20/4015* (2020.05); *G06Q 20/4014* (2013.01)
(58) Field of Classification Search
CPC ............... G06Q 20/4105; G06Q 20/4014
See application file for complete search history.

(56) References Cited

U.S. PATENT DOCUMENTS

| | | | | |
|---|---|---|---|---|
| 11,763,379 B2* | 9/2023 | Kudo | ............. | G06Q 30/08 |
| | | | | 705/37 |
| 2007/0205270 A1* | 9/2007 | Kemper | ......... | G06Q 30/0601 |
| | | | | 235/380 |
| 2015/0019409 A1* | 1/2015 | Vagiri | .......... | G06Q 20/3221 |
| | | | | 705/39 |
| 2016/0027073 A1 | 1/2016 | Eramian | | |
| 2016/0132670 A1 | 5/2016 | Salama et al. | | |
| 2020/0250728 A1 | 8/2020 | Fredrich et al. | | |
| 2022/0076269 A1* | 3/2022 | Phillips | .......... | G06Q 20/223 |
| 2023/0401582 A1* | 12/2023 | Roundy | ......... | G06Q 30/0201 |
| 2024/0037549 A1* | 2/2024 | Hefetz | .......... | H04W 4/029 |
| 2024/0152896 A1* | 5/2024 | Banga | ........... | G06Q 20/3224 |
| 2024/0362610 A1 | 10/2024 | Alampady et al. | | |

OTHER PUBLICATIONS

"Why Amazon's '1-Click' Ordering Was a Game Changer", University of Pennsylvania Wharton [retrieved Mar. 15, 2023]. Retrieved from the Internet <https://knowledge.wharton.upenn.edu/podcast/knowledge-at-wharton-podcast/amazons-1-click-goes-off-patent/>., Sep. 14, 2017, 9 Pages.

(Continued)

*Primary Examiner* — Robert R Niquette
(74) *Attorney, Agent, or Firm* — FIG. 1 Patents

(57) ABSTRACT

Techniques for managing data transactions are described and are implementable to enable data transactions (e.g., payment transactions) to be automatically generated in response to different conditions. In implementations, user interactions to generate payment transactions are tracked at different locations over different time durations. Accordingly, when payment transactions at a particular location reach a threshold, a data transaction record can be generated. The data transaction record can be used to automatically generate subsequent data transactions. Further, application presence across different devices can be used to generate data transactions.

20 Claims, 11 Drawing Sheets

(56) References Cited

OTHER PUBLICATIONS

Bentz, Mickael, "4 use cases for personalized push notifications", Retail Dive [retrieved Mar. 15, 2023]. Retrieved from the Internet <https://www.retaildive.com/ex/mobilecommercedaily/4-use-cases-for-personalized-push-notifications>., 5 Pages.
"Non-Final Office Action", U.S. Appl. No. 18/140,832, filed Dec. 5, 2024, 22 pages.
U.S. Appl. No. 18/140,832, "Restriction Requirement", U.S. Appl. No. 18/140,832, filed Sep. 5, 2024, 7 pages.

\* cited by examiner

MANAGING DATA TRANSACTIONS

BACKGROUND

The use of network-based payment systems has become commonplace across the world. For instance, users can pay for a large variety of goods and services using a network-based payment application, such as using a portable device, e.g., a smartphone. While the availability of payment applications can provide a great deal of convenience, it is not without challenges. For instance, a typical payment transaction may involve multiple user interactions and system processes to generate a payment transaction, expose the payment transaction to a user, receive user input to accept or modify the payment transaction, and then attempt to process the payment transaction. Thus, significant system and user resources may be utilized to initiate and resolve a typical payment transaction.

BRIEF DESCRIPTION OF THE DRAWINGS

Aspects of managing data transactions are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
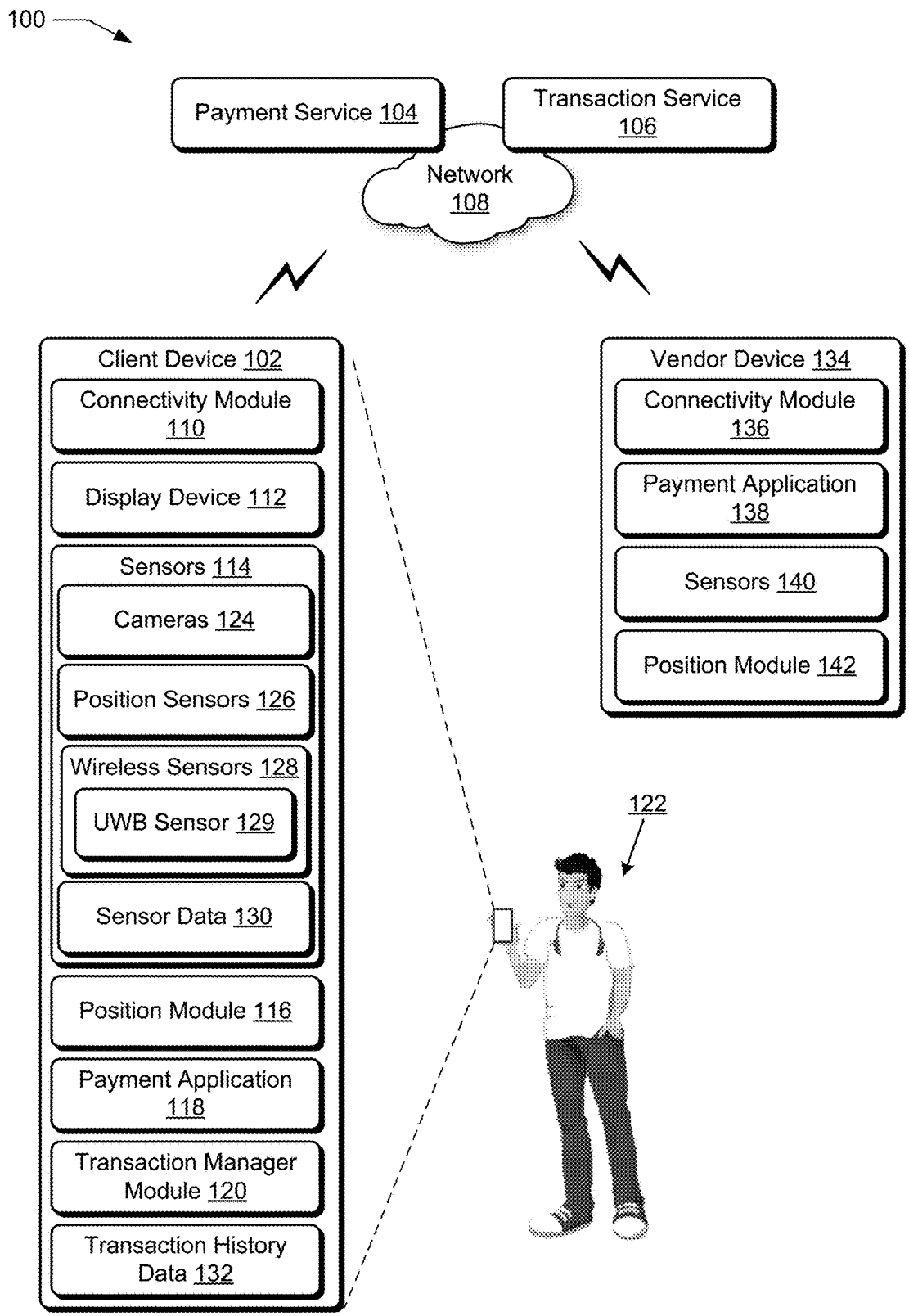
FIG. 1 illustrates an example environment in which aspects of managing data transactions can be implemented.

Techniques for managing data transactions are described and are implementable to enable data transactions (e.g., payment transactions) to be automatically generated in a variety of different scenarios. For example, various data transaction conditions can be tracked and utilized to automatically generate data transactions.

For instance, consider a scenario where a person regularly visits a particular vendor (e.g., a restaurant) and purchases a particular item and/or similar items. The user, for instance, interacts with a digital payment application on a device (e.g., a smartphone) to specify a transaction amount, a vendor identifier, an item to be purchased, etc. Alternatively or additionally, the user can unlock their device and scan a code (e.g., a QR code) to obtain various transaction parameters for performing a payment transaction. Thus, multiple user and system steps are involved to surface and process the payment transaction.

Accordingly, implementations described herein can track such user and system behaviors to enable payment transactions to be automatically generated and presented to a user, such as with little or no user interaction to generate a payment transaction. For instance, considering the scenario mentioned above, a system can track user behaviors over multiple payment transactions at the vendor and generate a data transaction record that describes attributes of the payment transactions, such as user location, time duration(s) that the user is positioned at the location, payment method(s) utilized for payment transactions, items purchased, etc.

Accordingly, when the user subsequently visits the vendor and remains for a period of time, the system can automatically generate a recommended payment transaction and present the recommended payment transaction to the user via the user's device. The recommended payment transaction, for example, may include a recommended payment amount, recommended purchase item(s), a recommended payment method, etc. Further, the recommended payment transaction may identify a user purchase history at the vendor. Accordingly, the user may interact with the recommended payment transaction to accept the recommendation to automatically initiate a payment transaction, e.g., a transfer of value (e.g., digitally) from the user account to the vendor account.

As another implementation and considering the scenario describe above, consider a first set of instances where the user visits the restaurant for a brief period of time (e.g., less than 10 minutes) to purchase an item on the go, such as to take to eat at work. In a second set of instances, however, the user may visit the restaurant for a sit down meal for an extended period of time, e.g., more than 20 minutes. Further, the first set of instances may be associated with a first transaction amount and the second set of instances may be associated with a second, higher transaction amount.

As yet another example, consider scenarios where a user visits a salon at different instances to receive different services. For instance, in a first set of instances the user may visit the salon to obtain a haircut which typically takes a first amount of time (e.g., around 20 minutes) and has a first transaction amount. In a second set of instances the user may visit the salon to obtain a massage which typically takes a second, longer time duration (e.g., an hour or more) and has a second, higher transaction amount. In these different instances the time spent at the salon can be correlated to different service types and different corresponding recommended transaction amounts.

Thus, implementations described herein can track different time durations of user presence at a location and correlate the different time durations with different transaction amounts. Thus, when the user is present at the location for a time duration, the system can automatically generate and surface a transaction recommendation that includes a transaction amount that is correlated to the time duration. The user can interact with the transaction recommendation to enable a payment transaction to be automatically performed.

Implementations also enable data transactions to be generated and performed based on presence of common applications across different devices. For instance, and in an extension and/or variation on the scenario introduced above, consider that the user visits the vendor carrying their device. Further, the user's device has a payment application installed, and a vendor device (e.g., a point of sale (POS) device) at the vendor also has the payment application installed. Accordingly, the presence of the common application between the user device and the vendor device is detected and thus various transaction recommendations pertaining to the vendor can be automatically presented via the user device. The vendor device, for instance, may transmit a transaction recommendation to the user device, such as a recommended transaction amount, item(s) for purchase, item promotions, item discounts, etc. Thus, the user may interact with the transaction recommendation to accept or decline the transaction recommendation.

Accordingly, techniques described herein enable automated generation and processing of data transactions. In implementations, a payment transaction represents a data transaction. For instance, digital payment transactions involve generating, transmitting, and processing various types of data and across a variety of different systems and networks. Thus, such digital payment transactions can be characterized as sets of computational operations much like other operations of a computing device and/or set of computing devices. Accordingly, by enabling automated generation of data transactions, the described techniques can conserve system resources (e.g., memory, processor bandwidth, network bandwidth, etc.) that may otherwise be used to manually generate data transactions, and thus the described techniques can improve the operation of computing devices and data networks. Further, user burden can be reduced by performing generating data transactions automatically while reducing user interaction to initiate and manage data transactions.

While features and concepts of managing data transactions can be implemented in any number of environments and/or configurations, aspects of the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of managing data transactions can be implemented. The environment 100 includes a client device 102, a payment service 104, and a transaction service 106 that are connectable to a network 108. The client device 102 can be implemented in various ways and according to various form factors such as a smartphone, tablet device, a laptop computer, a wearable computing device, and so forth. The network 108 can be implemented in various ways and according to a variety of different architectures, including wireless networks, wired networks, and combinations thereof.

The client device 102 includes various functionalities and data that enable the client device 102 to perform different aspects of managing data transactions discussed herein, including a connectivity module 110, a display device 112, sensors 114, a position module 116, a payment application 118, and a transaction manager module 120. The connectivity module 110 represents functionality (e.g., logic and hardware) for enabling the client device 102 to interconnect with other devices and/or networks, such as the network 108. The connectivity module 110, for instance, enables wireless and/or wired connectivity of the client device 102. In a wireless scenario the connectivity module 110 enables connectivity and data communication via a variety of different wireless protocols, such as wireless broadband, wireless cellular, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The display device 112 represents functionality for visual output of content by the client device 102. In implementations the display device 112 includes touch input functionality (e.g., a digitizer) to enable a user of the client device 102 to provide touch input to the client device 102.

The sensors 114 represent functionality for detecting various physical and/or logic conditions pertaining to the client device 102. In this particular example the sensors 114 include cameras 124, position sensors 126, and wireless sensors 128. The cameras 124 represent functionality for detecting visual objects in an environment surrounding the client device 102 and can generate visual data that describes the visual objects. The position sensors 126 represent functionality for determining a position and orientation of the client device 102 and for detecting changes in position and orientation of the client device 102. Examples of the position sensors 126 include an accelerometer, a gyroscope, a magnetometer, a GPS and/or other geographic system sensor, and so forth.

The position sensors 126 can be implemented to detect a position of the client device 102, such as a geographic position, a physical location, a relative position within a physical location, and so forth. Further, the position sensors 126 can enable a spatial orientation of the client device 102 to be detected and can be implemented in various ways to provide different types of orientation detection, such as 3 degrees of freedom (3-DOF), 6 degrees of freedom (6-DOF), 9 degrees of freedom (9-DOF), and so forth. The wireless sensors 128 represent functionality to detect direct types of wireless signal, such as wireless signal transmitted in different frequencies. The wireless sensors 128, for instance, include an antenna and/or set of antennas tuned to detect wireless signal received via different wireless frequencies. The wireless sensors 128, for instance, include an ultra-wideband (UWB) sensor 129 which is operable to receive and detect wireless signal in UWB frequencies.

These examples of sensors 114 are not to be construed as limiting and the sensors 114 are implementable to include a variety of different sensor types and sensor instances for sensing physical and logic phenomena.

The position module 116 represents functionality for determining a location of the client device 102. The position module 116, for instance, can receive sensor data 130 from the sensors 114 to determine a location of the client device 102, such as a physical location including a geographic location, a street address, a known location, a physical facility, a micro-location (e.g., a precise location such as within a larger location), and so forth. The position module 116 can utilize various types of sensor data 130 for determining a location of the client device 102, such as image data generated by the cameras 124, position data generated by the position sensors 126, wireless data generated by the wireless sensors 128, combinations thereof, and so forth. In implementations the position module 116 can track locations where the client device 102 is detected such as to determine locations frequently visited by the person 122.

The payment application 118 represents functionality to perform payments via the client device 102, such as to cause value to be exchanged for services, e.g., exchanges of goods and/or services. For instance, when a vendor provides a service to the person 122, the person 122 can interact with the payment application 118 to cause a value amount (e.g., a monetary amount) to be transferred (e.g., digitally) from a user account to the vendor's account.

The transaction manager module 120 represents functionality to track different payment transactions, such as payment transactions performed via the client device 102 and/or payments performed by the person 122 via a user account. Based on tracking different payment transactions, the transaction manager module 120 can generate transaction history data 132 that describes different attributes of payment transactions, such as payment transactions performed via the payment application 118. The transaction history data 132 can include various information for payment transactions, such as transaction positions (e.g., geographic locations, addresses, micro-locations within larger locations, etc.), duration of device presence at positions in conjunction with payment transactions, transaction amounts, vendor IDs, payment methods used, etc. As further detailed herein, the transaction manager module 120 can utilize the transaction history data 132 to provide transaction recommendations such as for payment transactions at different positions of the client device 102.

The environment 100 further includes a vendor device 134 which represents a device associated with a vendor that can provide items (e.g., goods and/or services), such as to the person 122. In at least one implementation the vendor device 134 represents at least a part of a point of sale (POS) system. The vendor device 134 includes various functionality including a connectivity module 136, a payment application 138, sensors 140, and a position module 142. The connectivity module 136 represents functionality (e.g., logic and hardware) for enabling the vendor device 134 to interconnect with other devices and/or networks, such as the network 108. The connectivity module 136, for instance, enables wireless and/or wired connectivity of the vendor device 134. In a wireless scenario the connectivity module 136 enables connectivity and data communication via a variety of different wireless protocols, such as wireless broadband, wireless cellular, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The payment application 138 represents functionality for enabling the vendor device 134 to receive value, such as based on services provided by a vendor associated with the vendor device 134. For instance, the payment application 118 can initiate a payment transaction for a service provided to the person 122 by a vendor, and the payment application 138 can receive a transfer of credit from a user account to a vendor account. In at least some implementations the payment applications 118, 138 represent different instances of a common payment application, such as a payment application deployed and/or managed by the payment service 104 and/or the transaction service 106.

The sensors 140 represent functionality for detecting various physical and/or logic conditions pertaining to the vendor device 134. In implementations the sensors 140 may include various sensor types such as described with reference to the sensors 114 of the client device 102. The position module 142 represents functionality for determining a location of other devices relative to the vendor device 134. The position module 142, for instance, can receive sensor data from the sensors 140 to determine a location of the client device 102 relative to the vendor device 134, such as to estimate a distance between the vendor device 134 and the client device 102.

According to implementations, the payment service 104 and the transaction service 106 can participate in various aspects of managing data transactions described herein. For instance, the payment service 104 can serve as a broker functionality between the payment applications 118, 138 to enable payment transactions to be performed. The transaction service 106 can perform aspects of managing data transactions described herein. For instance, implementations described herein can be performed by the transaction manager module 120, the transaction service 106, and/or cooperatively between the transaction manager module 120 and the transaction service 106.

Having discussed an example environment in which the disclosed techniques can be performed, consider now some example scenarios and implementation details for implementing the disclosed techniques.

Figure 2:
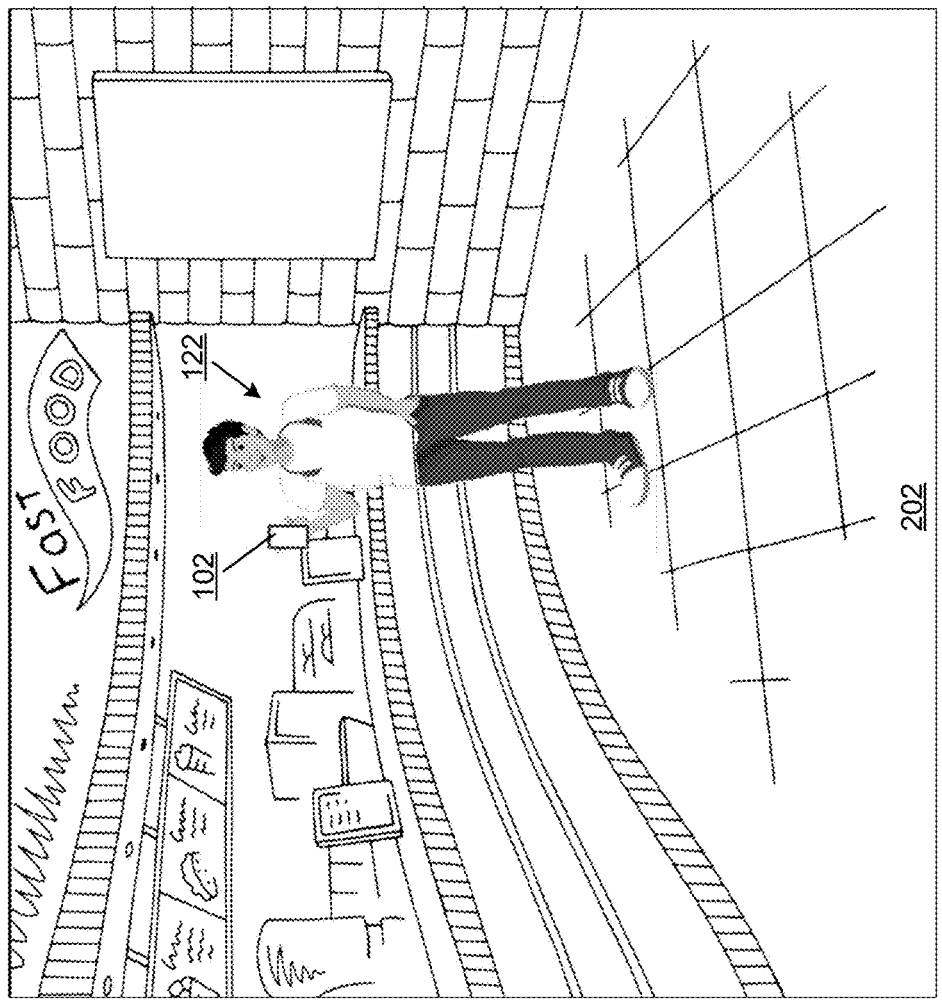
FIG. 2 depicts an example scenario for training a system for managing data transactions in accordance with one or more implementations.
Figure 2:
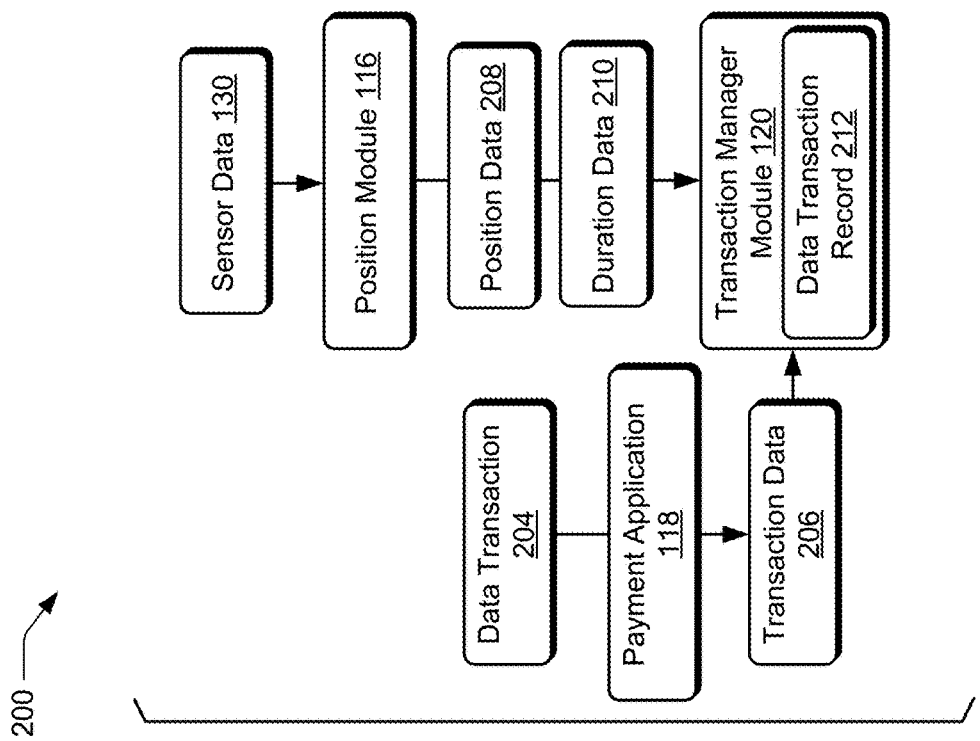

FIG. 2 depicts an example scenario 200 for training a system for managing data transactions in accordance with one or more implementations. The scenario 200 can be implemented in the environment 100 and incorporates attributes of the environment 100 introduced above. The scenario 200, for instance, represents aspects of a training phase for training a system to provide data transaction recommendations.

In the scenario 200 the person 122 is located at a location 202, which in this example represents a restaurant. Further, the person 122 is carrying the client device 102. The person 122 engages in a data transaction 204 at the location 202, such as via the payment application 118. The data transaction 204, for instance, represents an exchange of value for a purchase of food items at the location 202. Based on the data transaction 204 the payment application 118 generates transaction data 206 that describes attributes of the data transaction 204. The transaction data 206, for instance, includes a vendor identifier for a vendor associated with the data transaction 204 (e.g., a restaurant identifier), a description of items purchased (e.g., goods and/or services), a transaction amount (e.g., a price paid for the items), a payment method, and so forth.

Further to the scenario 200 the position module 116 receives sensor data 130 from the sensors 114. The position module 116 utilizes the sensor data 130 to generate position data 208 that describes a position of the client device 102. The position data 208 can represent the position of the client device 102 in various ways, such as in terms of city, state, geographic coordinates, street address, etc. Further, the position data 208 can include a business identifier, such as for a business (e.g., restaurant) located at the location 202. The position module 116 also generates duration data 210 that indicates a time duration that the client device 102 is located at the location 202 described by the position data 208. Accordingly, the transaction manager module 120 generates a data transaction record 212 that includes attributes of the transaction data 206, the position data 208, and the duration data 210. The data transaction record 212, for instance, describes attributes of the transaction data 206 such as a transaction amount, items purchased, vendor identifier, etc. Further, the data transaction record 212 describes a position of the client device 102 at a particular date and time, a time duration that the client device 102 is located at the position during the data transaction 204, and so forth.

According to implementations the transaction manager module 120 generates the data transaction record 212 to indicate a number of data transactions that match attributes of the data transaction 204. For instance, when the person 122 visits the location 202 multiple times and multiple different data transactions occur, the transaction manager module 120 updates the data transaction record 212 to identify attributes of each data transaction, e.g., with different instances of the transaction data 206, the position data 208, and the duration data 210.

In implementations the transaction manager module 120 can generate multiple instances of data transaction records 212, such as based on different data transactions at a same location (e.g., the location 202), different data transactions at different locations, different transaction amounts, different time durations, different items purchased, etc.

Figure 3:
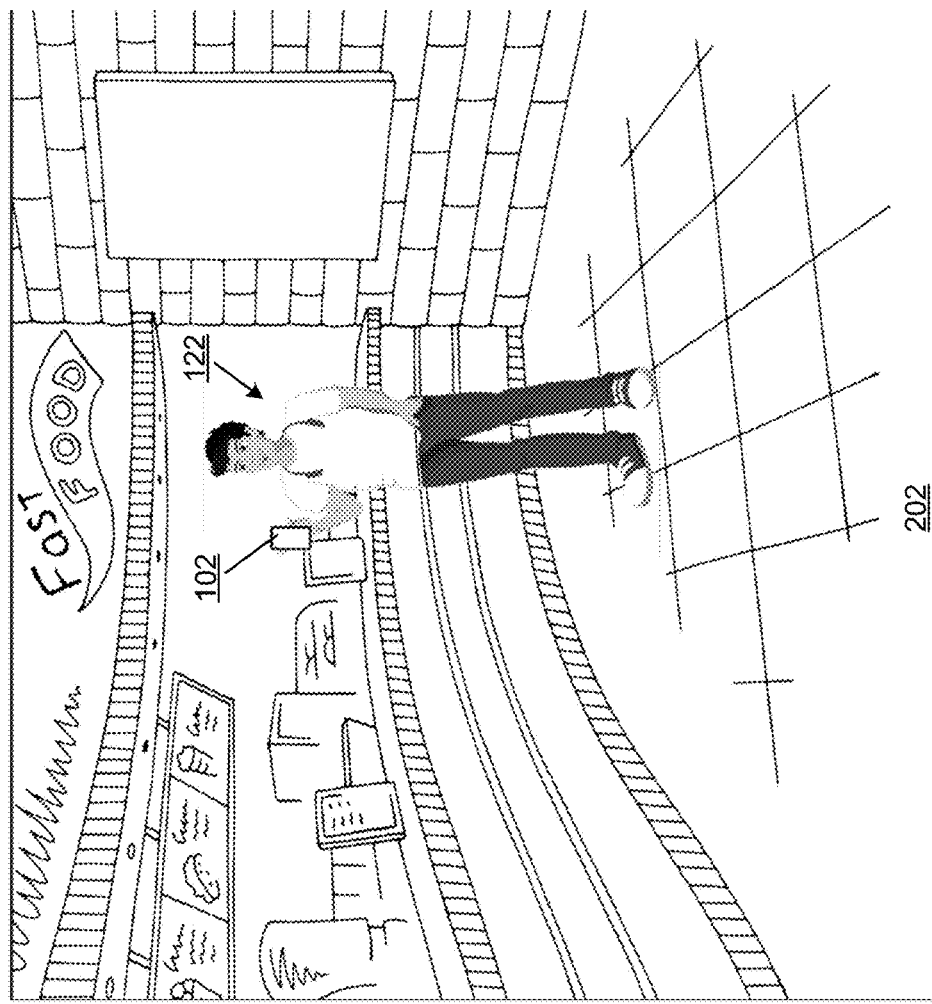
FIG. 3 depicts an example scenario for generating data transactions in accordance with one or more implementations.
Figure 3:
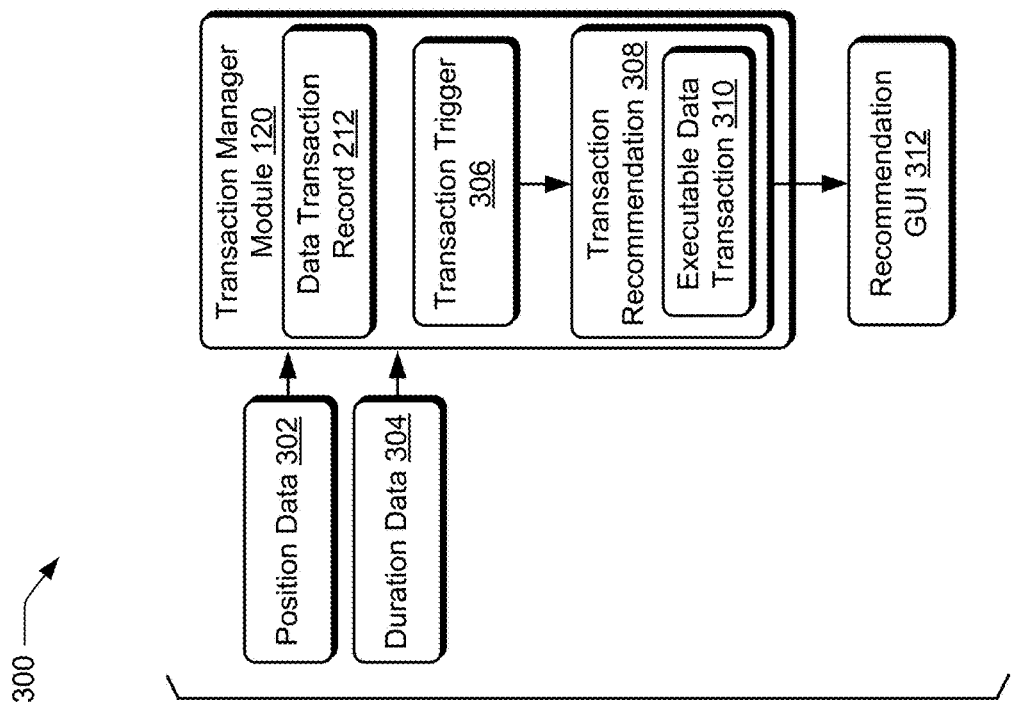

FIG. 3 depicts an example scenario 300 for generating data transactions in accordance with one or more implementations. The scenario 300 can be implemented in the environment 100 and incorporates attributes of the environment 100 introduced above. The scenario 300, for instance, represents a continuation of the scenario 200. The scenario 200, for example, represents an implementation phase for providing data transaction recommendations, such as after system training described in the scenario 200.

In the scenario 300 the person 122 is located at the location 202, such as at a subsequent date and time than represented in the scenario 200. Further, the transaction manager module 120 receives (e.g., from the position module 116) position data 302 and duration data 304 respectively describing a position of the client device 102 and a time duration that the client device 102 is positioned at the location 202. The transaction manager module 120 correlates the position data 302 and the duration data 304 to the data transaction record 212 and determines that a transaction trigger 306 occurs. The transaction trigger 306, for instance, occurs in response to a set of data transaction conditions occurring, such as a position of the client device 102 for a particular time duration. For example, the data transaction record 212 indicates different minimum time durations for presence of the client device 102 at the location 202 after which the transaction trigger 306 can occur. Further, the data transaction record 212 can indicate a minimum number of data transactions to be performed at the location 202 before the transaction trigger 306 occurs.

Further to the scenario 300 and in response to the transaction trigger 306, the transaction manager module 120 generates a transaction recommendation 308 that includes an executable data transaction 310. The transaction recommendation 308, for instance, includes transaction parameters for a data transaction, such as a transaction amount, a transaction method (e.g., a payment method), a transaction history (e.g., at the location 202), etc. The executable data transaction 310 represents a set of data transaction parameters that are executable to perform a data transaction.

The transaction manager module 120 then generates and outputs a recommendation GUI 312 via the client device 102 that includes aspects of the transaction recommendation 308. The recommendation GUI 312, for instance, describes attributes of the transaction recommendation 308, such as a vendor identifier associated with the location 202, a recommended transaction amount, a recommended transaction method (e.g., payment method), a transaction history at the location 202, etc. In at least one implementation the recommendation GUI 312 is output via the client device 102 in response to the person 122 unlocking the client device 102 from a locked state. For instance, after the person 122 is present at the location 202 for a time duration, the person 122 unlocks the client device 102 and the recommendation GUI 312 is displayed and/or output in some other way. Alternatively or additionally, the recommendation GUI 312 can be output while the client device 102 is in a locked state, such as part of a lock screen of the client device 102.

Further, the recommendation GUI 312 is configured to receive user input to perform various actions pertaining to the transaction recommendation 308, such as to accept or decline the transaction recommendation 308, to modify the transaction recommendation 308, to obtain more information about the transaction recommendation 308, and so forth.

Figure 4:
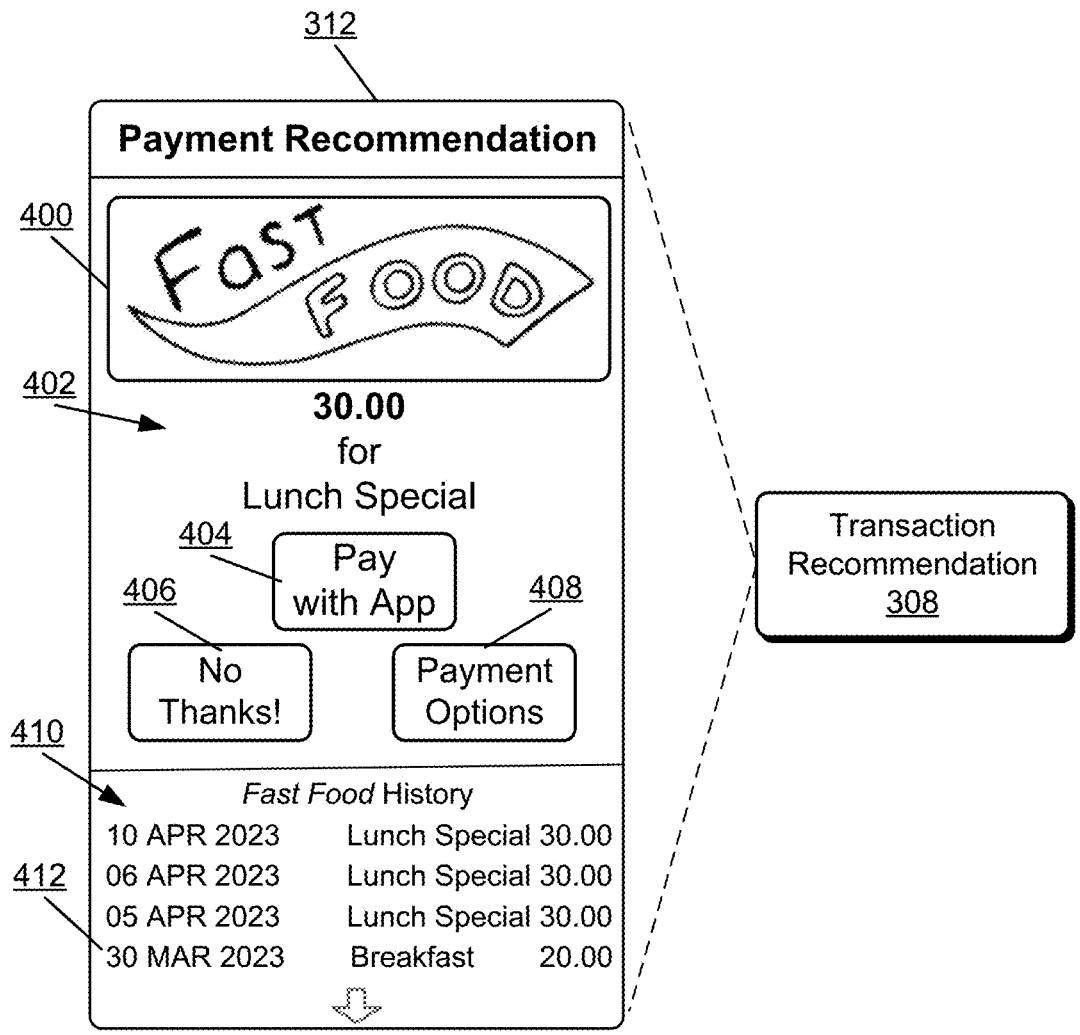
FIG. 4 illustrates an example recommendation graphical user interface (GUI) in accordance with one or more implementations.

FIG. 4 illustrates an example recommendation GUI 312 in accordance with one or more implementations. The recommendation GUI 312 includes a vendor identifier 400, a transaction description 402, an accept control 404, a decline control 406, an options control 408, and a history region 410. The vendor identifier 400 identifies a particular vendor (e.g., a merchant) associated with the transaction recommendation 308, e.g., an identifier for a vendor from the transaction data 206 used to generate the data transaction record 212. In at least one implementation the vendor identifier 400 can be received and/or extracted from vendor-specific information, such as information transmitted from the vendor device 134.

The transaction description 402 identifies attributes of a recommended data transaction, such as a transaction amount (e.g., a recommended payment amount) and a transaction item, e.g., a recommended item for purchase as part of a data transaction. The accept control 404 is selectable to cause the executable data transaction 310 to be executed. For instance, a user selection of the accept control 404 causes a data transaction (e.g., a payment transaction) to be executed, such as via the payment application 118 and/or the payment application 138. The accept control 404, for example, identifies a recommended transaction method for executing the executable data transaction 310, such as based on transaction history indicated by the data transaction record 212.

The decline control 406 is selectable to decline execution of the data transaction 310. For instance, user selection of the decline control 406 causes the recommendation GUI 312 to be removed from display and the transaction recommendation 308 to be ignored. The options control 408 is selectable to present other transaction options, such as to enable the person 122 to input different transaction amounts, different transaction methods (e.g., different payment methods), different transaction items (e.g., items for purchase), etc.

The history region 410 is populated with transaction history information, such as for past data transactions that occurred at the location 202. The data transaction record 212, for instance, tracks data transactions at the location 202 over time and thus the history region 410 can be populated with information about previous data transactions, such as transaction dates, transaction items, transaction amounts, etc. In implementations different transaction history entries in the history region 410 are selectable to cause additional transaction information about a selected entry to be presented and/or to perform actions pertaining to a selected history entry. For instance, a history entry 412 indicates different transaction information (e.g., items purchased, transaction amount, etc.) than identified in the transaction description 402. Accordingly, the person 122 can select the history entry 412 to cause a data transaction to be executed based on transaction parameters of the history entry 412, e.g., to override transaction parameters indicated by the transaction description 402.

Figure 5:
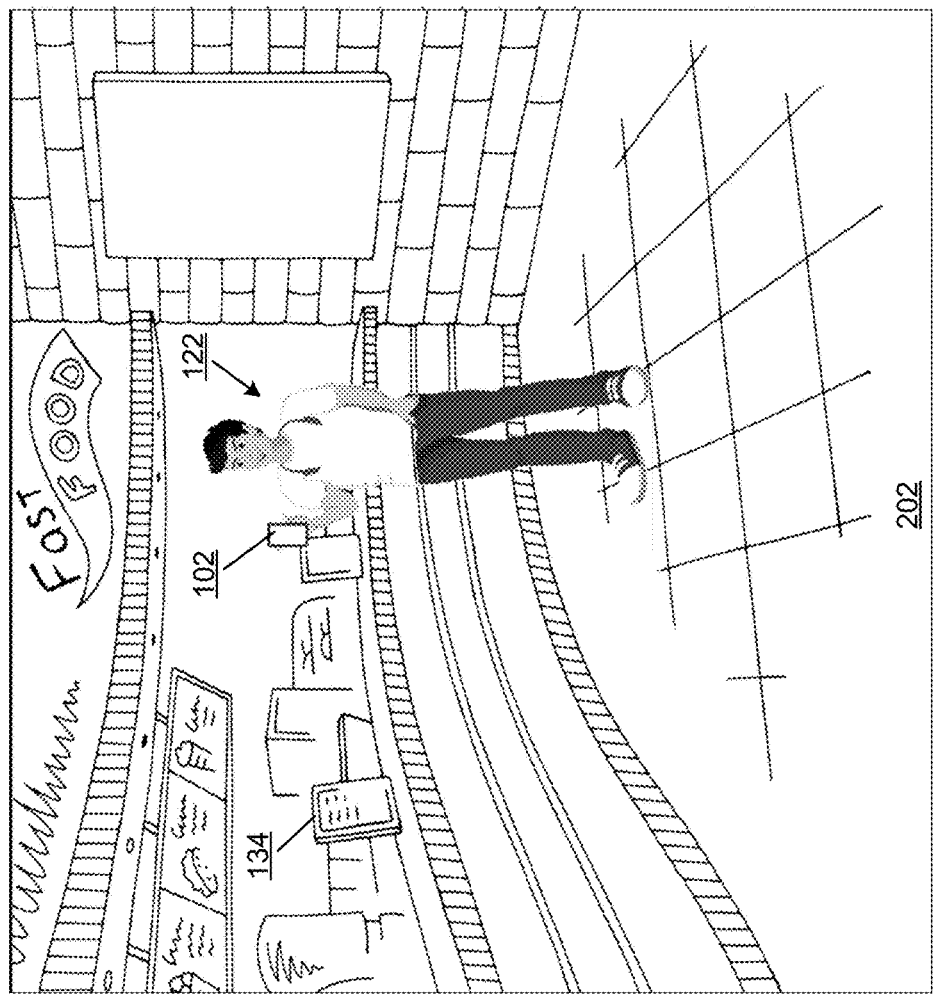
FIG. 5 depicts an example scenario for using application data for data transactions in accordance with one or more implementations.
Figure 5:
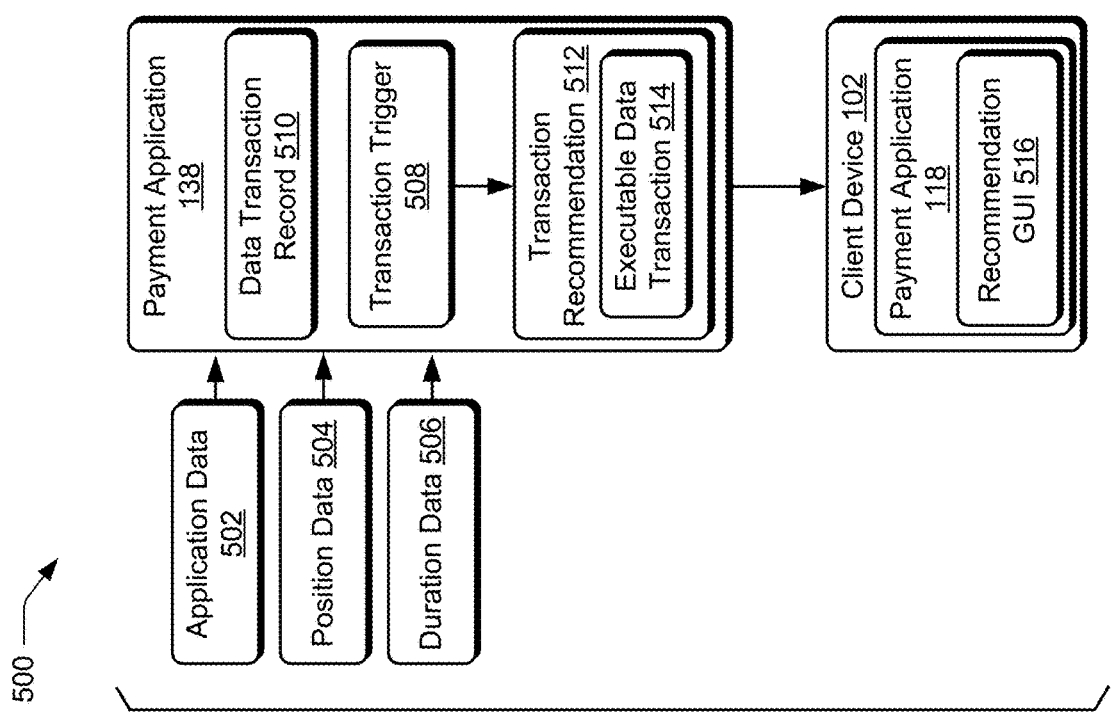

FIG. 5 depicts an example scenario 500 for using application data for data transactions in accordance with one or more implementations. The scenario 500 can be implemented in the environment 100 and incorporates attributes of the environment 100 introduced above. In implementations the scenario 500 can be combined in various ways with aspects of the scenarios described above.

In the scenario 500 the person 122 is carrying the client device 102 and is positioned at the location 202. The person 122, for example, is at the location 202 to purchase items such as food items from a vendor located at the location 202. Further, the vendor device 134 is positioned within the location 202. The payment application 138 on the vendor device 134 receives application data 502 indicating that the payment application 118 is available on the client device 102. The vendor device 134, for instance, receives data transmitted from the client device 102 indicating that the payment application 118 is present on the client device 102. Alternatively or additionally the vendor device 134 maintains historical data from the client device 102 identifying that the payment application 118 is present on the client device 102, and/or the vendor device 134 receives network data (e.g., from the payment service 104) indicating that the payment application 118 is present on the client device 102. As mentioned above, the payment applications 118, 138 can represent different instances of a common payment application.

The payment application 138 also receives position data 504 and duration data 506, such as from the position module 142. The position module 142, for example, receives sensor data from the sensors 140 and generates the position data 504 that describes a position (e.g., location) of the client device 102 relative to the vendor device 134. The position module 142 can determine the position of the client device 102 in various ways, such as based on wireless signal transmitted by the client device 102 and received by the sensors 140. In implementations the position data 504 indicates an estimated distance between the client device 102 and the vendor device 134. Further, the duration data 506 can indicate a time duration and/or set of time durations that the client device 102 is located within a particular distance and/or set of distances from the vendor device 134.

Further to the scenario 500, the payment application 138 determines based at least in part on the application data 502, the position data 504, and the duration data 506 that a transaction trigger 508 occurs. The transaction trigger 508, for instance, occurs based on occurrence of a set of one or more conditions, such as that the client device 102 includes the payment application 138 and is located within a threshold minimum distance from the vendor device 134 for a threshold minimum time duration.

In at least some implementations a data transaction record 510 can be used to determine whether the transaction trigger 508 occurs. The data transaction record 510, for instance, can indicate various transaction-related information, such as historical and/or average time durations associated with transactions at the location 202, average and/or historical transaction amounts, items historically purchased at the location 202, and so forth. In implementations the data transaction record 510 can be associated with persons in general and/or specific to a user identity associated with the client device 102, e.g., the person 122. The data transaction record 510, for example, can be generated based on a transaction history of the person 122 at the location 202 and/or at locations associated with an entity (e.g., an enterprise entity) with a presence at the location 202 and/or represented by the vendor device 134.

Further to the scenario 500 and based at least in part on the transaction trigger 508, the payment application 138 generates a transaction recommendation 512 that includes an executable data transaction 514. The transaction recommendation 512 can include various transaction-related parameters, such as a recommended payment option (e.g., with a recommended transaction value and a recommended payment method (e.g., using a same payment application)), discounts available at the location 202, coupons for items available for purchase, reward points (e.g., available to the person 122), and so forth. Accordingly, the payment application 138 causes the transaction recommendation 512 to be transmitted to the client device 102, such as wirelessly via the vendor device 134.

The client device 102 receives the transaction recommendation 512 and the payment application 118 presents the transaction recommendation 512 within a recommendation GUI 516. The recommendation GUI 516 can be presented in various ways, such as in response to an unlock action on the client device 102, as part of a lock screen on the client device 102, etc. The person 122 can interact with the recommendation GUI 516, such as to cause a payment transaction to be implemented and/or to participate in an offer and/or promotion identified by the transaction recommendation 512.

Figure 6:
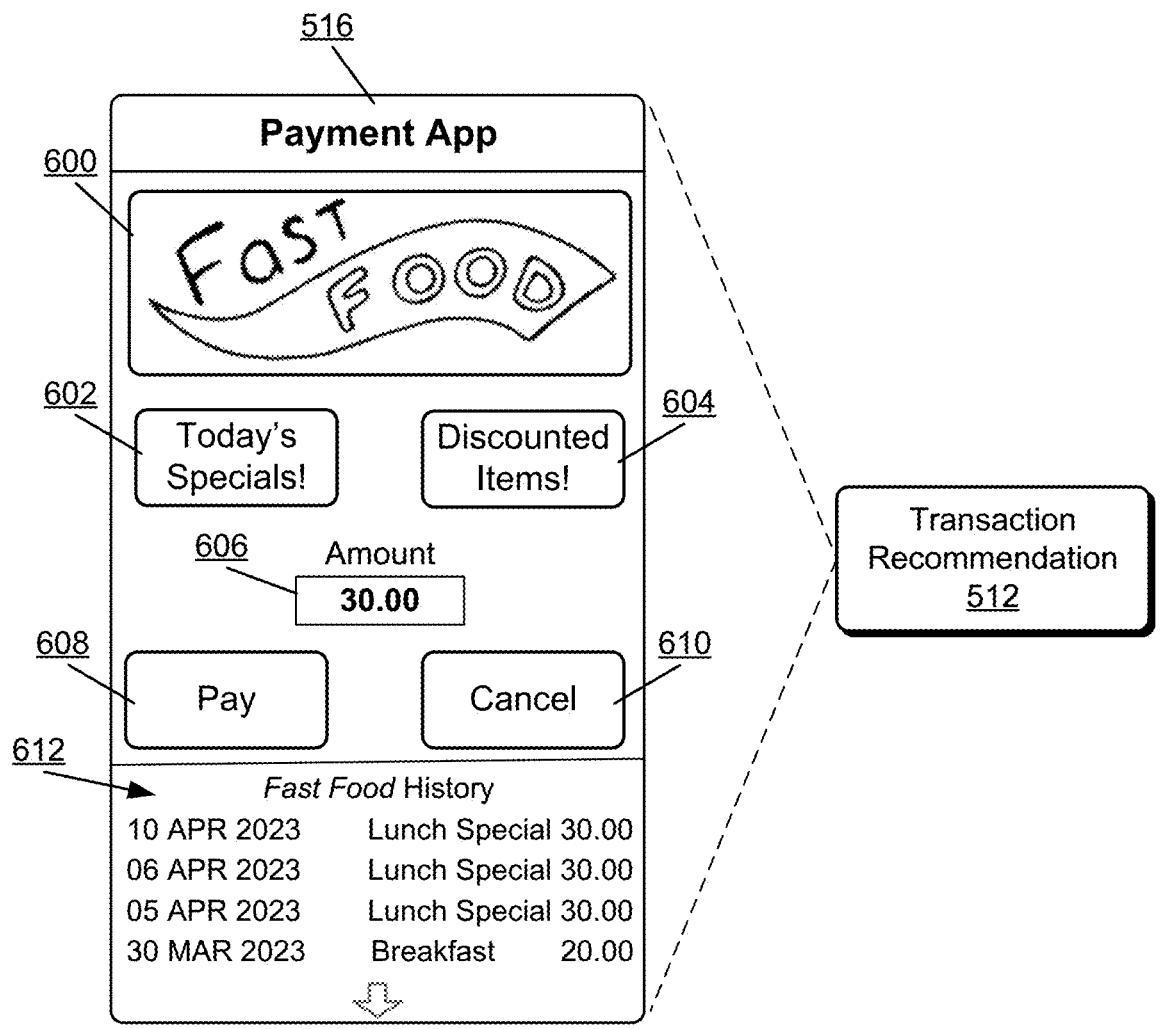
FIG. 6 illustrates an example recommendation GUI in accordance with one or more implementations.

FIG. 6 illustrates an example recommendation GUI 516 in accordance with one or more implementations. The recommendation GUI 516 includes a vendor identifier 600, a promotions control 602, and a discounts control 604. The vendor identifier 600 identifies a particular vendor (e.g., a merchant) associated with the transaction recommendation 512, e.g., an identifier for a vendor from the transaction recommendation 512. In at least one implementation the vendor identifier 600 can be received and/or extracted from vendor-specific information, such as information transmitted from the vendor device 134.

The promotions control 602 is selectable to cause different product promotions to be presented, such as for new items for sale. The discounts control 604 is selectable to cause representations of different discounted items to be presented, such as items that currently have a reduced cost.

The recommendation GUI 516 further includes an amount field 606, an accept control 608, a decline control 610, and a history region 612. The amount field 606 indicates an estimated transaction amount for the transaction recommendation 512, e.g., for a payment transaction associated with the transaction recommendation 512. The transaction amount presented in the amount field 606 can be determined in various ways, such as based on a user transaction history indicated by the data transaction record 510, based on a transaction determined by the payment application 138, etc. In implementations the amount field 606 is user customizable, such to enable the person 122 to enter a custom transaction amount.

The accept control 608 is selectable to cause the executable data transaction 514 (e.g., a payment transaction) to be executed, such as via the payment application 118 and/or the payment application 138. The decline control 610 is selectable to decline execution of the executable data transaction 514. For instance, user selection of the decline control 610 causes the recommendation GUI 516 to be removed from display and the transaction recommendation 512 to be ignored. Example attributes of the history region 612 are discussed above with reference to the history region 410, such as information about past data transactions that occurred at the location 202 and/or associated with an entity (e.g., business entity) associated with the vendor device 134.

According to implementations aspects of the scenarios described herein are combinable in various ways. For instance, at least some of the training aspects described with reference to the scenario 200 can be circumvented (e.g., skipped) using the application-to-application communication discussed in the scenario 500.

Figure 7:
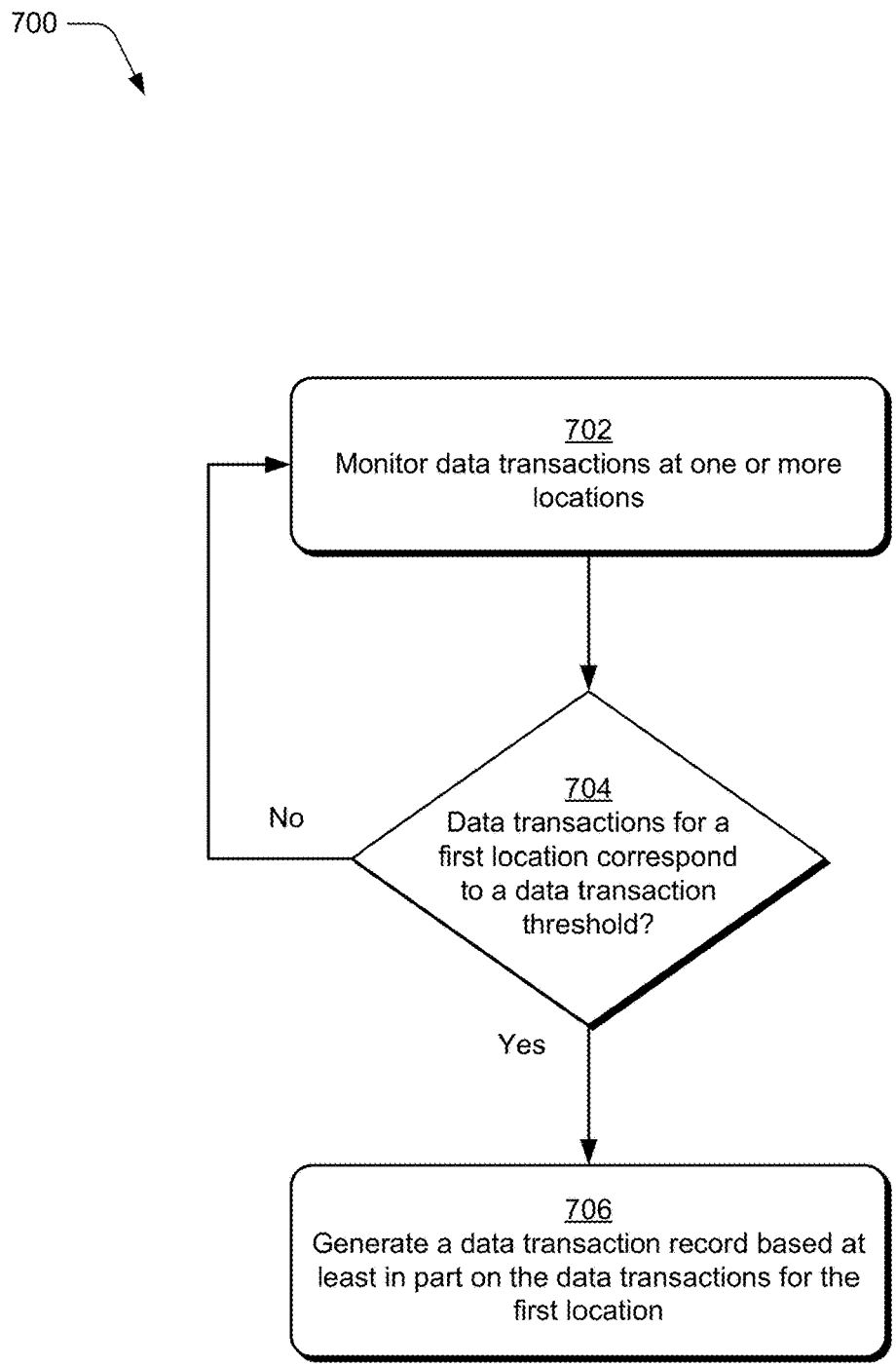
FIG. 7 illustrates a flow chart depicting an example method for training a system to generate data transactions in accordance with one or more implementations.

FIG. 7 illustrates a flow chart depicting an example method 700 for training a system to generate data transactions in accordance with one or more implementations. The method 700, for instance, represents portions of a training phase for training a system for implementation aspects of managing data transactions. At 702 data transactions at one or more locations are monitored. The transaction manager module 120, for instance, monitors data transactions at different locations, such as payment transactions at different vendor locations. Various aspects of the data transactions can be monitored, such as position information, time duration, transaction amounts, items purchased as part of the data transactions, and so forth.

At 704 it is determined whether data transactions for a first location correspond to a data transaction threshold. The data transaction threshold, for instance, represents a minimum number of data transactions that occur at the first location, such as over a time period. In implementations the data transaction threshold may be associated with a particular transaction amount and/or transaction amount range.

If data transactions for the first location do not correspond to the data transaction threshold ("No"), the method returns to step 702. If the data transactions for the first location correspond to the data transaction threshold ("Yes"), at 706 a data transaction record is generated based at least in part on the data transactions for the first location corresponding to the data transaction threshold. The data transaction record can include various information, such as data transaction parameters for the first location. Examples of the data transaction parameters include one or more time durations for data transactions for the first location, data transaction amounts, items purchased as part of data transactions, etc. Examples of different information that can be included as part of a data transaction record are described throughout this disclosure. The data transaction record can be used for various purposes, such as for generating data transaction recommendations as described throughout this disclosure.

Figure 8:
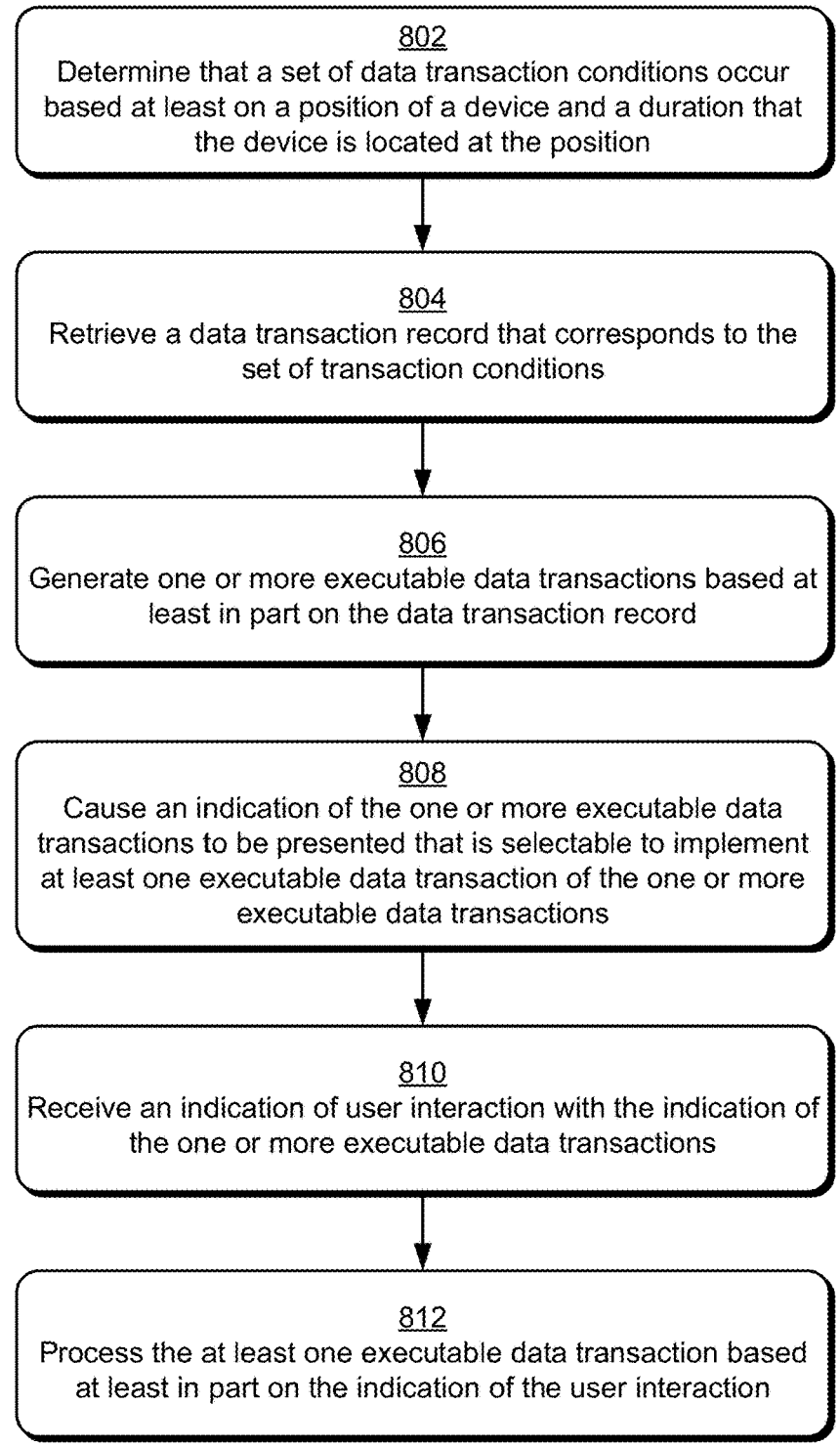
FIG. 8 illustrates a flow chart depicting an example method for generating data transactions in accordance with one or more implementations.

FIG. 8 illustrates a flow chart depicting an example method 800 for generating data transactions in accordance with one or more implementations. The method 800, for instance, may be implemented in conjunction with and/or subsequently to the method 700. At 802 it is determined that a set of data transaction conditions occur based at least on a position of a device and a duration that the device is located at the position. The transaction manager module 120, for instance, receives position data and time duration data (e.g., transaction conditions) indicating that the client device 102 is present at a location for a minimum threshold time duration.

At 804 a data transaction record is retrieved that corresponds to the set of transaction conditions. For instance, the transaction manager module 120 searches the transaction history data 132 to identify a data transaction record that corresponds to the set of transaction conditions, such as a position of the client device 102 and a time duration that the client device 102 is located at the position.

At 806 one or more executable data transactions are generated based at least in part on the data transaction record. The transaction manager module 120, for example, generates transaction parameters that can be used to execute a data transaction, such as transaction amount(s), transaction items, transaction history information, etc.

At 808 an indication of the one or more executable data transactions is caused to be presented that is selectable to implement at least one executable data transaction of the one or more executable data transactions. For instance, the transaction manager module 120 generates a transaction recommendation and causes the transaction recommendation to be output via a recommendation GUI.

At 810 an indication is received of user interaction with the indication of the one or more executable data transactions. A user, for instance, interacts with a recommendation GUI to indicate an action to be performed, such as to select a data transaction and/or set of data transactions to be implemented, to decline implementation of the one or more executable transactions, to modify and implement one or more of the data transactions, etc.

At 812 the at least one executable data transaction is processed based at least in part on the indication of the user interaction. For instance, if a user provides input to select to accept the at least one executable data transaction, the transaction manager module 120 causes the at least one executable data transaction to be implemented. In an implementation where the executable data transaction represents a payment transaction, the transaction manager module 120 can cause a payment value amount to be transferred from a user account to a different account, such as vendor account.

Alternatively, if the user provides input to decline the at least one executable data transaction, the transaction manager module 120 can cancel performance of the at least one executable data transaction. For instance, the transaction manager module 120 can remove the recommendation GUI.

As yet another implementation, a user may interact with the recommendation GUI to modify various transaction parameters, such as a transaction amount, an item involved in the data transaction, a vendor, etc. Accordingly, the transaction manager module 120 may cause a modified executable data transaction to be performed based on the user modified parameter(s).

In implementations a data transaction record can be updated based on the user interaction, such as to indicate that the user accepted a data transaction recommendation, declined a data transaction recommendation, modified a data transaction recommendation, etc. For instance, user interaction with a data transaction recommendation can be used as feedback to further train and improve the recommendation algorithm(s) to enable more accurate recommendations to be provided.

Figure 9:
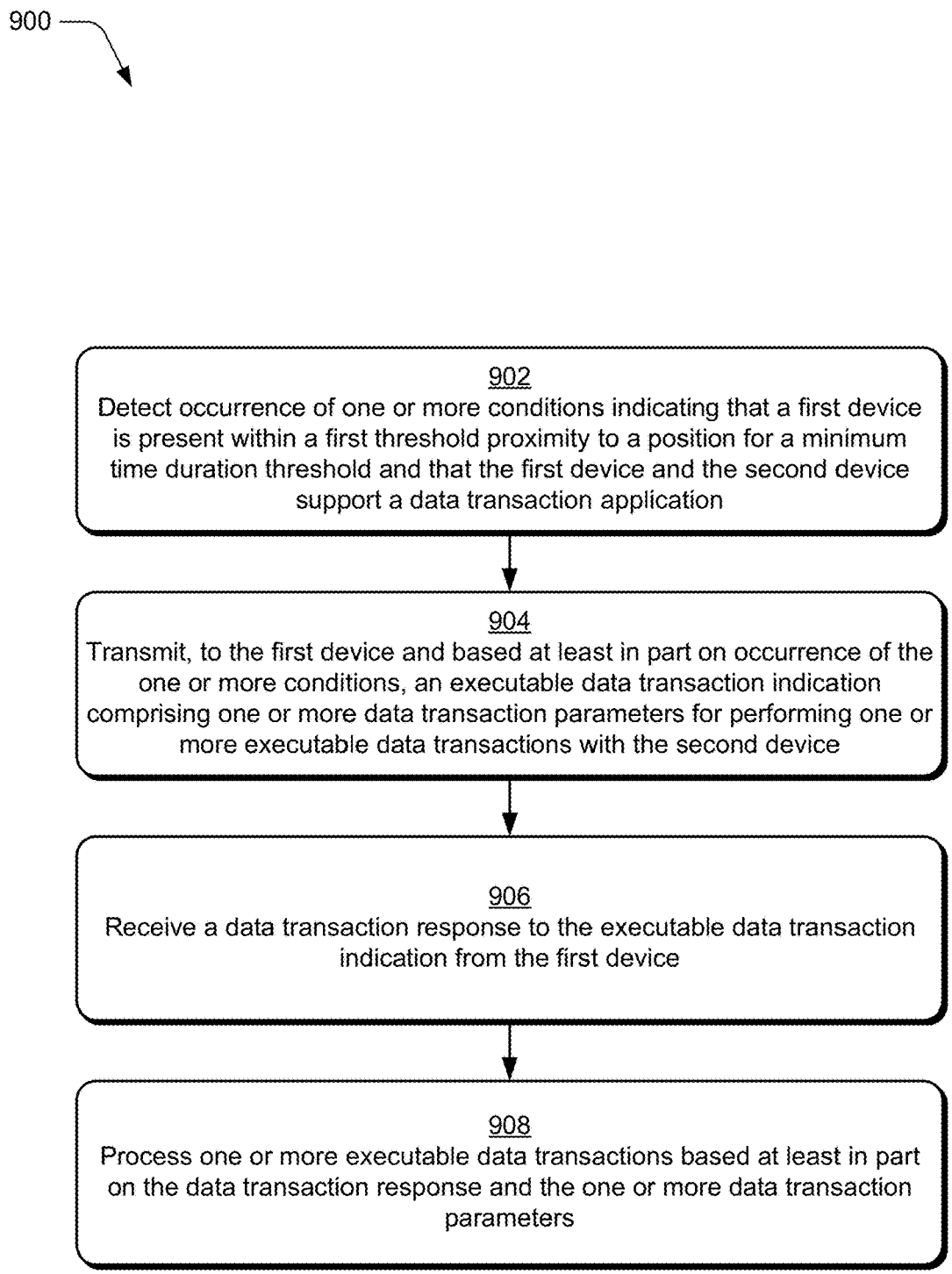
FIG. 9 illustrates a flow chart depicting an example method for using application data for data transactions in accordance with one or more implementations.

FIG. 9 illustrates a flow chart depicting an example method 900 for using application data for data transactions in accordance with one or more implementations. At 902 occurrence of one or more conditions is detected indicating that a first device is present within a first threshold proximity to a position for a minimum time duration threshold and that the first device and the second device support a data transaction application. A payment application (e.g., one or more of the payment applications 118, 138) detects that the client device 102 is within a threshold proximity to the vendor device 134 for minimum amount of time, e.g., based on a predefined time duration threshold.

At 904 an executable data transaction indication is transmitted, to the first device and based at least in part on occurrence of the one or more conditions, the executable data transaction indication including one or more data transaction parameters for performing one or more executable data transactions with the second device. The payment application 138 on the vendor device 134, for instance, causes a transaction recommendation associated with one or more executable data transactions to be transmitted to the client device 102. The payment application 118 at the client device 102 may output a recommendation GUI that includes the transaction recommendation. Examples of different transaction-related parameters that may be included in the executable data transaction indication (e.g., in the recommendation GUI) are discussed above, and may include a recommendation to perform a payment transaction using a particular payment application, such as the common payment applications 118, 138 between the client device 102 and the vendor device 134.

At 906 a data transaction response to the executable data transaction indication is received from the first device. A user, for instance, interacts with the recommendation GUI to accept a recommended action pertaining to an executable data transaction, such as to perform a data transaction (e.g., a payment transaction), to accept an offer and/or a promotion relating to the vendor device 134, to decline a recommended action pertaining to an executable data transaction, etc.

At 908 one or more executable data transactions are processed based at least in part on the data transaction response and the one or more data transaction parameters. For instance, where a user provides input to accept a data transaction recommendation, a data transaction can be executed. The payment application 138 and/or the payment application 118, for instance, can cause a payment transaction to be executed, such as a transfer of value from a user account to a vendor account. Where a user provides input to decline a data transaction recommendation, the data transaction recommendation can be canceled and a recommendation GUI removed from display. Further, a user may modify one or more transaction parameters (e.g., transaction amount, transaction items, etc.) and thus a modified data transaction may be performed.

Figure 10:
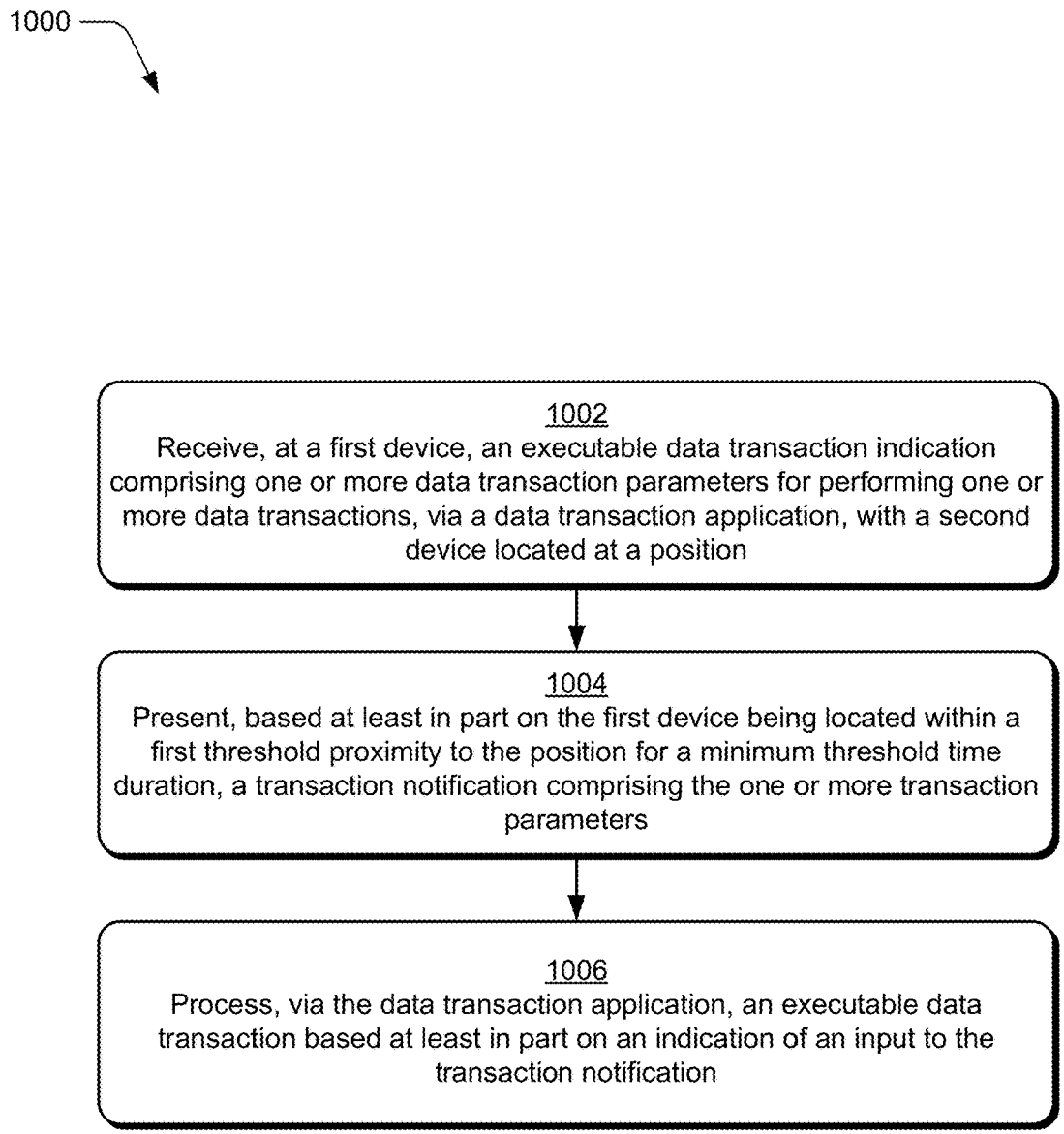
FIG. 10 illustrates a flow chart depicting an example method for using application data for data transactions in accordance with one or more implementations.

FIG. 10 illustrates a flow chart depicting an example method 1000 for using application data for data transactions in accordance with one or more implementations. At 1002 an executable data transaction indication is received at a first device, the executable data transaction indication including one or more data transaction parameters for performing one or more data transactions, via a data transaction application, with a second device located at a position. The client device 102, for instance, receives a transaction recommendation from the vendor device 134. Examples of different transaction parameters are described above, such as a transaction amount and/or other related transaction parameters.

At 1004 and based at least in part on the first device being located within a first threshold proximity to the position for a minimum threshold time duration, a transaction notification is presented including the one or more transaction parameters. The payment application 118, for instance, causes the client device 102 to display a recommendation GUI that includes the transaction parameters. In at least one implementation the client device 102 can receive the executable data transaction indication and can prevent (e.g., delay) output of the transaction notification until the client device 102 is within the threshold proximity to the vendor device 134, such as for the threshold time duration.

At 1006 an executable data transaction is processed, via the data transaction application, based at least in part on an indication of an input to the transaction notification. A user, for instance, provides input to the recommendation GUI to accept, decline, or modify the executable data transaction indication. For instance, where a user provides input to accept a data transaction recommendation, a data transaction can be executed. The payment application 138 and/or the payment application 118, for instance, can cause a payment transaction to be executed, such as a transfer of value from a user account to a vendor account. Where a user provides input to decline a data transaction recommendation, the data transaction recommendation can be canceled and a recommendation GUI removed from display. Further, a user may modify one or more transaction parameters (e.g., transaction amount, transaction items, etc.) and thus a modified data transaction may be performed.

The example methods described above may be performed in various ways, such as for implementing different aspects of the systems and scenarios described herein. Further, while certain operations and/or actions are described with regard to specific entities (e.g., the client device 102, the vendor device 134, etc.), it is to be appreciated that the techniques described herein may be performed by any suitable entity and/or cooperatively between different entities.

Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 11:
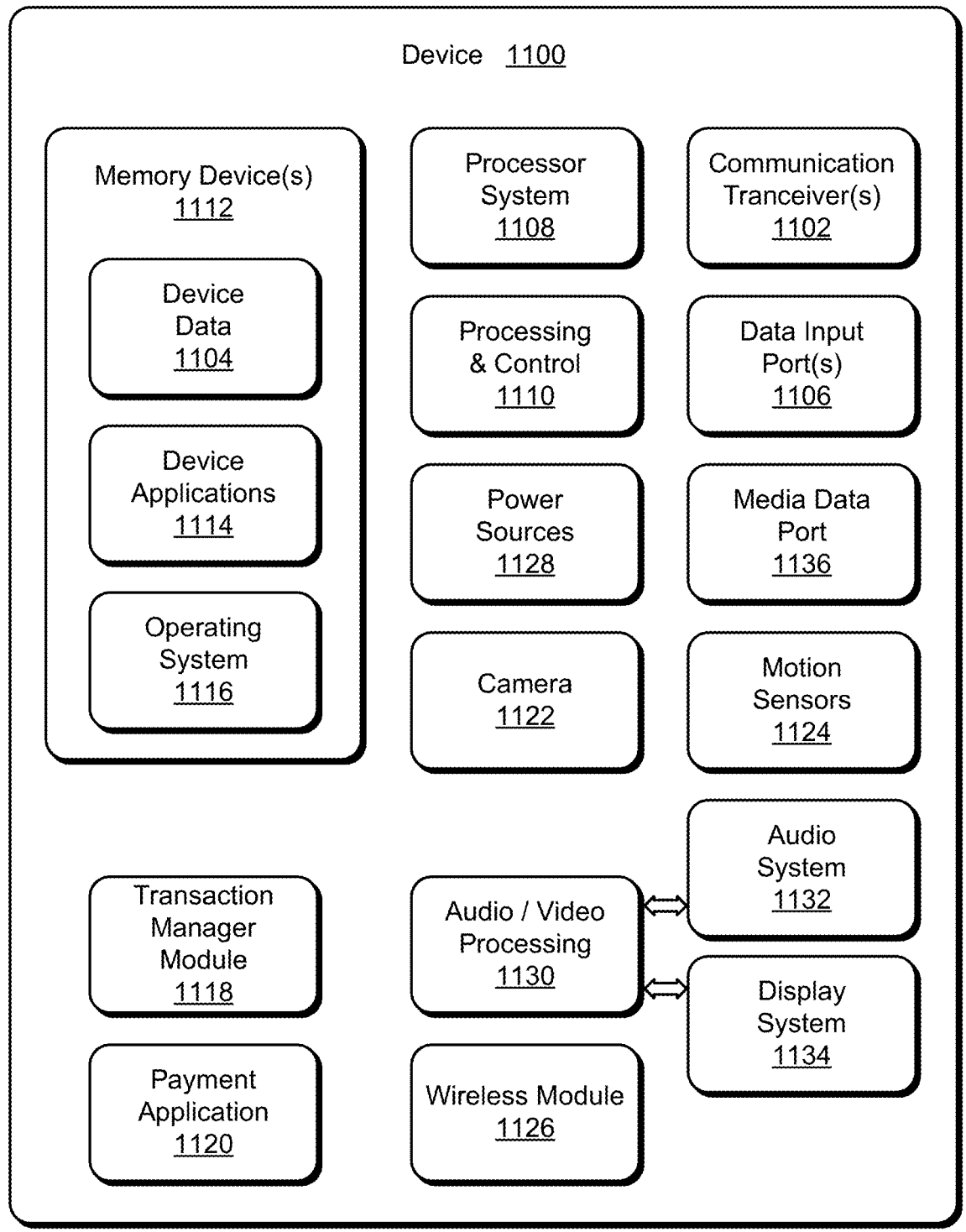
FIG. 11 illustrates various components of an example device in which aspects of managing data transactions can be implemented in accordance with one or more implementations.

FIG. 11 illustrates various components of an example device 1100 in which aspects of managing data transactions can be implemented. The example device 1100 can be implemented as any of the devices described with reference to the previous FIGS. 1-10, such as any type of mobile device, mobile phone, mobile device, wearable device, tablet, computing, communication, entertainment, gaming, media play back, and/or other type of electronic device. For example, the client device 102 and/or the vendor device 134 as shown and described with reference to FIGS. 1-10 may be implemented as the example device 1100.

The device 1100 includes communication transceivers 1102 that enable wired and/or wireless communication of device data 1104 with other devices. The device data 1104 can include any of device identifying data, device location data, wireless connectivity data, and wireless protocol data. Additionally, the device data 1104 can include any type of audio, video, and/or image data. Example communication transceivers 1102 include wireless personal area network (WPAN) radios compliant with various IEEE 1102.15 (Bluetooth™) standards, wireless local area network (WLAN) radios compliant with any of the various IEEE 1102.11 (Wi-Fi™) standards, wireless wide area network (WWAN) radios for cellular phone communication, wireless metropolitan area network (WMAN) radios compliant with various IEEE 1102.16 (WiMAX™) standards, and wired local area network (LAN) Ethernet transceivers for network data communication.

The device 1100 may also include one or more data input ports 1106 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1100 includes a processing system 1108 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1110. The device 1100 may further include any type of a system bus or other data and command transfer system that couples the various components within the device. A system bus can include any one or combination of different bus structures and architectures, as well as control and data lines.

The device 1100 also includes computer-readable storage memory 1112 (e.g., memory devices) that enable data storage, such as data storage devices that can be accessed by a computing device, and that provide persistent storage of data and executable instructions (e.g., software applications, programs, functions, and the like). Examples of the computer-readable storage memory 1112 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1100 may also include a mass storage media device.

The computer-readable storage memory 1112 provides data storage mechanisms to store the device data 1104, other types of information and/or data, and various device applications 1114 (e.g., software applications). For example, an operating system 1116 can be maintained as software instructions with a memory device and executed by the processing system 1108. The device applications may also include a device manager, such as any form of a control application, software application, signal-processing and control module, code that is native to a particular device, a hardware abstraction layer for a particular device, and so on. Computer-readable storage memory 1112 represents media and/or devices that enable persistent and/or non-transitory storage of information in contrast to mere signal transmission, carrier waves, or signals per se. Computer-readable storage memory 1112 do not include signals per se or transitory signals.

In this example, the device 1100 includes a transaction manager module 1118 that implements aspects of managing data transactions and may be implemented with hardware components and/or in software as one of the device applications 1114. In an example, the transaction manager module 1118 can be implemented as the transaction manager module 120 described in detail above. In implementations, the transaction manager module 1118 may include independent processing, memory, and logic components as a computing and/or electronic device integrated with the device 1100. The device 1100 also includes a payment application 1120 which may represent an implementation of one or more of the payment applications 118, 138.

In this example, the example device 1100 also includes a camera 1122 and motion sensors 1124, such as may be implemented in an inertial measurement unit (IMU). The motion sensors 1124 can be implemented with various sensors, such as a gyroscope, an accelerometer, and/or other types of motion sensors to sense motion of the device. The various motion sensors 1124 may also be implemented as components of an inertial measurement unit in the device.

The device 1100 also includes a wireless module 1126, which is representative of functionality to perform various wireless communication tasks. For instance, for the client device 102, the wireless module 1126 can be leveraged to scan for and detect wireless networks, as well as negotiate wireless connectivity to wireless networks for the client device 102. The device 1100 can also include one or more power sources 1128, such as when the device is implemented as a mobile device. The power sources 1128 may include a charging and/or power system, and can be implemented as a flexible strip battery, a rechargeable battery, a charged super-capacitor, and/or any other type of active or passive power source.

The device 1100 also includes an audio and/or video processing system 1130 that generates audio data for an audio system 1132 and/or generates display data for a display system 1134. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1136. In implementations, the audio system and/or the display system are integrated components of the example device. Alternatively, the audio system and/or the display system are external, peripheral components to the example device.

Although implementations of managing data transactions have been described in language specific to features and/or methods, the subject of the appended claims is not necessarily limited to the specific features or methods described. Rather, the features and methods are disclosed as example implementations of managing data transactions, and other equivalent features and methods are intended to be within the scope of the appended claims. Further, various different examples are described, and it is to be appreciated that each described example can be implemented independently or in connection with one or more other described examples.

In addition to the previously described methods, any one or more of the following:

In some aspects, the techniques described herein relate to a system including: one or more processors; and computer-readable storage media storing instructions that are executable by the one or more processors to: detect occurrence of one or more conditions indicating that a first device is present within a first threshold proximity to a position for a minimum time duration threshold and that the first device and a second device support a data transaction application; transmit, to the first device and based at least in part on occurrence of the one or more conditions, an executable data transaction indication including one or more data transaction parameters for performing one or more executable data transactions with the second device; receive a data transaction response to the executable data transaction indication from the first device; and process one or more executable data transactions based at least in part on the data transaction response and the one or more data transaction parameters.

In some aspects, the techniques described herein relate to a system, wherein the one or more conditions further include that the first device is within a second threshold proximity to the second device.

In some aspects, the techniques described herein relate to a system, wherein the instructions are executable by the one or more processors to: determine a time duration that the first device is within the first threshold proximity to the position; correlate the time duration to a data transaction value; and generate the one or more data transaction parameters to include the data transaction value.

In some aspects, the techniques described herein relate to a system, wherein the instructions are executable by the one or more processors to: maintain a data transaction record for the position that includes different time durations and different respective data transaction values for the different time durations.

In some aspects, the techniques described herein relate to a system, wherein the one or more data transaction parameters include a data transaction amount.

In some aspects, the techniques described herein relate to a system, wherein the instructions are executable by the one or more processors to: access a user identifier for the first device and a data transaction record for the user identifier; and determine the data transaction amount based at least in part on the user identifier and the position.

In some aspects, the techniques described herein relate to a system, wherein the instructions are executable by the one or more processors to determine the data transaction amount further based on a time duration that the first device is within the first threshold proximity to the position.

In some aspects, the techniques described herein relate to a system, wherein the data transaction response includes an indication to accept the executable data transaction indication, and to process the one or more executable data transactions, the instructions are executable by the one or more processors to cause the one or more executable data transactions to be executed.

In some aspects, the techniques described herein relate to a system, wherein the instructions are executable by the one or more processors to: maintain a data transaction record for a user identifier associated with the first device; and update the data transaction record to indicate acceptance of the executable data transaction indication.

In some aspects, the techniques described herein relate to a system, wherein the data transaction response includes an indication to decline the executable data transaction indication, and to process the one or more executable data transactions, the instructions are executable by the one or more processors to not execute the one or more executable data transactions.

In some aspects, the techniques described herein relate to a system, wherein the instructions are executable by the one or more processors to: maintain a data transaction record for a user identifier associated with the first device; and update the data transaction record to indicate that the executable data transaction indication is declined.

In some aspects, the techniques described herein relate to a system including: one or more processors; and computer-readable storage media storing instructions that are executable by the one or more processors to: receive, at a first device, an executable data transaction indication including one or more data transaction parameters for performing one or more data transactions, via a data transaction application, with a second device located at a position: present, based at least in part on the first device being located within a first threshold proximity to the position for a minimum threshold time duration, a transaction notification including the one or more data transaction parameters; and process, via the data transaction application, an executable data transaction based at least in part on an indication of an input to the transaction notification.

In some aspects, the techniques described herein relate to a system, wherein the instructions are executable by the one or more processors to represent the transaction notification further based on an unlock action occurring at the first device.

In some aspects, the techniques described herein relate to a system, wherein the instructions are executable by the one or more processors to: receive the executable data transaction indication prior to the first device being located within the first threshold proximity to the position for the minimum threshold time duration; and prevent the transaction notification from being presented until the first device is located within the first threshold proximity to the position for the minimum threshold time duration.

In some aspects, the techniques described herein relate to a system, wherein the instructions are executable by the one or more processors to: receive the executable data transaction indication prior to the first device being located within a second threshold proximity to the second device; and prevent the transaction notification from being presented until the first device is located within the second threshold proximity to the second device.

In some aspects, the techniques described herein relate to a system, wherein the one or more data transaction parameters include one or more transaction amounts, the input to the transaction notification includes an indication to accept the transaction notification, and to process the executable data transaction, the instructions are executable by the one or more processors to cause the executable data transaction to be executed based on a transaction amount of the one or more transaction amounts.

In some aspects, the techniques described herein relate to a system, wherein the transaction notification includes multiple different transaction amounts, and the input to the transaction notification includes a selection of the transaction amount from the multiple different transaction amounts.

In some aspects, the techniques described herein relate to a method including: detecting occurrence of one or more conditions indicating that a first device is present within a first threshold proximity to a position for a minimum time duration threshold and that the first device and a second device support a data transaction application: transmitting, to the first device and based at least in part on occurrence of the one or more conditions, an executable data transaction indication including one or more data transaction parameters for performing one or more executable data transactions with the second device: receiving a data transaction response to the executable data transaction indication from the first device; and processing one or more executable data transactions based at least in part on the data transaction response and the one or more data transaction parameters.

In some aspects, the techniques described herein relate to a method, further including: determining a time duration that the first device is within the first threshold proximity to the position: correlating the time duration to a data transaction value; and generating the one or more data transaction parameters to include the data transaction value.

In some aspects, the techniques described herein relate to a method, wherein the one or more data transaction parameters include a data transaction amount, the method further including: accessing a user identifier for the first device and a data transaction record for the user identifier; and determining the data transaction amount based at least in part on the user identifier and the position.

What is claimed is:

1. A system comprising:
   one or more processors; and
   computer-readable storage media storing instructions that are executable by the one or more processors to:
      detect, based at least in part on position data and duration data, occurrence of one or more conditions indicating that a first device is present within a first threshold proximity to a position for a minimum time duration threshold and that the first device and a second device support a data transaction application;
      access a user identifier for the first device and a data transaction record for the user identifier;
      determine a data transaction amount based at least in part on the user identifier and the position;
      transmit, to the first device and based at least in part on occurrence of the one or more conditions, an executable data transaction indication comprising one or more data transaction parameters for performing one or more executable data transactions with the second device, the one or more data transaction parameters comprising the data transaction amount;
      receive a data transaction response to the executable data transaction indication from the first device; and
      process one or more executable data transactions based at least in part on the data transaction response and the one or more data transaction parameters.

2. The system of claim 1, wherein the one or more conditions further comprise that the first device is within a second threshold proximity to the second device.

3. The system of claim 1, wherein the instructions are executable by the one or more processors to:
   determine a time duration that the first device is within the first threshold proximity to the position;
   correlate the time duration to the data transaction amount; and
   generate the one or more data transaction parameters to comprise the data transaction amount.

4. The system of claim 3, wherein the instructions are executable by the one or more processors to:
   maintain a data transaction record for the position that comprises different time durations and different respective data transaction amounts for the different time durations.

5. The system of claim 1, wherein the instructions are executable by the one or more processors to determine the data transaction amount further based on a time duration that the first device is within the first threshold proximity to the position.

6. The system of claim 1, wherein the data transaction response comprises an indication to accept the executable data transaction indication, and to process the one or more executable data transactions, the instructions are executable by the one or more processors to cause the one or more executable data transactions to be executed.

7. The system of claim 6, wherein the instructions are executable by the one or more processors to:
   maintain a data transaction record for a user identifier associated with the first device; and
   update the data transaction record to indicate acceptance of the executable data transaction indication.

8. The system of claim 1, wherein the data transaction response comprises an indication to decline the executable data transaction indication, and to process the one or more executable data transactions, the instructions are executable by the one or more processors to not execute the one or more executable data transactions.

9. The system of claim 8, wherein the instructions are executable by the one or more processors to:
   maintain a data transaction record for a user identifier associated with the first device; and
   update the data transaction record to indicate that the executable data transaction indication is declined.

10. The system of claim 1, wherein one or more of the position data or the duration data comprises sensor data from one or more sensors of the first device.

11. The system of claim 1, wherein the data transaction amount is further determined based on a time duration that the first device is detected as being present at the position.

12. A system comprising:
    one or more processors; and
    computer-readable storage media storing instructions that are executable by the one or more processors to:
       receive, at a first device, an executable data transaction indication comprising one or more data transaction parameters for performing one or more data transactions, via a data transaction application, with a second device located at a position;
       detect that an unlock action occurs to cause the first device to transition from a locked state to an unlocked state;
       present, based at least in part on the unlock action and the first device being located within a first threshold proximity to the position for a minimum threshold time duration, a transaction notification comprising the one or more data transaction parameters; and
       process, via the data transaction application, an executable data transaction based at least in part on an indication of an input to the transaction notification.

13. The system of claim 12, wherein the instructions are executable by the one or more processors to:
    receive the executable data transaction indication prior to the first device being located within the first threshold proximity to the position for the minimum threshold time duration; and
    prevent the transaction notification from being presented until the first device is located within the first threshold proximity to the position for the minimum threshold time duration.

14. The system of claim 12, wherein the instructions are executable by the one or more processors to:
    receive the executable data transaction indication prior to the first device being located within a second threshold proximity to the second device; and
    prevent the transaction notification from being presented until the first device is located within the second threshold proximity to the second device.

15. The system of claim 12, wherein the one or more data transaction parameters comprise one or more transaction amounts, the input to the transaction notification comprises an indication to accept the transaction notification, and to process the executable data transaction, the instructions are executable by the one or more processors to cause the executable data transaction to be executed based on a transaction amount of the one or more transaction amounts.

16. The system of claim 15, wherein the transaction notification comprises multiple different transaction amounts, and the input to the transaction notification comprises a selection of the transaction amount from the multiple different transaction amounts.

17. The system of claim 12, wherein the instructions are executable by the one or more processors to:
  determine, based at least in part on sensor data from one or more sensors of the first device, that the first device is located within the first threshold proximity to the position for the minimum threshold time duration.

18. A method comprising:
  detecting, based at east in part on position data and duration data, occurrence of one or more conditions indicating that a first device is present within a first threshold proximity to a position for a minimum time duration threshold and that the first device and a second device support a data transaction application;
  accessing a user identifier for the first device and a data transaction record for the user identifier;
  determining a data transaction amount based at least in part on the user identifier and the position;
  transmitting, to the first device and based at least in part on occurrence of the one or more conditions, an executable data transaction indication comprising one or more data transaction parameters for performing one or more executable data transactions with the second device, the one or more transaction parameters comprising the data transaction amount;
  receiving a data transaction response to the executable data transaction indication from the first device; and
  processing one or more executable data transactions based at least in part on the data transaction response and the one or more data transaction parameters.

19. The method of claim 18, further comprising:
  determining a time duration that the first device is within the first threshold proximity to the position;
  correlating the time duration to the data transaction amount; and
  generating the one or more data transaction parameters to comprise the data transaction amount.

20. The method of claim 18, wherein one or more of the position data or the duration data comprises sensor data from one or more sensors of the first device.

* * * * *